United States Patent [19]
Bushnell et al.

[11] Patent Number: 6,027,754
[45] Date of Patent: Feb. 22, 2000

[54] UNIFORM PRODUCT FLOW IN A HIGH-ELECTRIC-FIELD TREATMENT CELL

[75] Inventors: Andrew H. Bushnell, San Diego; Samuel W. Lloyd, La Mesa, both of Calif.

[73] Assignee: Purepulse Technologies, Inc., San Diego, Calif.

[21] Appl. No.: 09/107,114

[22] Filed: Jun. 30, 1998

[51] Int. Cl.$^7$ ............................... A23L 3/00; A23L 3/26
[52] U.S. Cl. ..................... 426/238; 426/239; 426/244; 99/451; 422/22; 422/186.04
[58] Field of Search ................... 426/238, 239, 426/244; 99/451; 422/22, 186.04

[56] References Cited

U.S. PATENT DOCUMENTS

| | | | |
|---|---|---|---|
| 4,157,245 | 6/1979 | Mitchell et al. | 48/197 R |
| 4,533,743 | 8/1985 | Medeiros et al. | 549/489 |
| 4,699,797 | 10/1987 | Fast | 426/508 |
| 4,838,154 | 6/1989 | Dunn et al. | 99/451 |
| 5,376,350 | 12/1994 | Tenny et al. | 423/478 |
| 5,549,041 | 8/1996 | Zhang et al. | 99/451 |
| 5,575,974 | 11/1996 | Wurzburger et al. | 422/22 |
| 5,582,732 | 12/1996 | Mao et al. | 210/603 |
| 5,690,978 | 11/1997 | Yin et al. | 426/237 |
| 5,756,051 | 5/1998 | Overton et al. | 422/108 |
| 5,776,529 | 7/1998 | Qin et al. | 99/451 |

*Primary Examiner*—Nina Bhat
*Attorney, Agent, or Firm*—Fitch, Even, Tabin & Flannery

[57] ABSTRACT

A deactivation approach for deactivating microorganisms in a high-strength-electric field treatment system, can be characterized as an apparatus for reducing microorganism levels in products. The apparatus has an inlet tube of substantially uniform cross-sectional area extending from a distance before a treatment zone to at least into the treatment zone; a substantially ogival electrode nose positioned in the treatment zone; and an outer electrode forming an interior of the inlet tube in the treatment zone. The treatment system can be employed in a method having steps of flowing the product through an inlet tube of substantially uniform cross-sectional area extending from a distance before a treatment zone to at least into the treatment zone; flowing the product between a substantially ogival electrode nose positioned in the treatment zone, and an outer electrode forming an interior of the inlet tube in the treatment zone; and applying at least one high strength electric field pulse to the product during transit through the treatment zone.

20 Claims, 12 Drawing Sheets

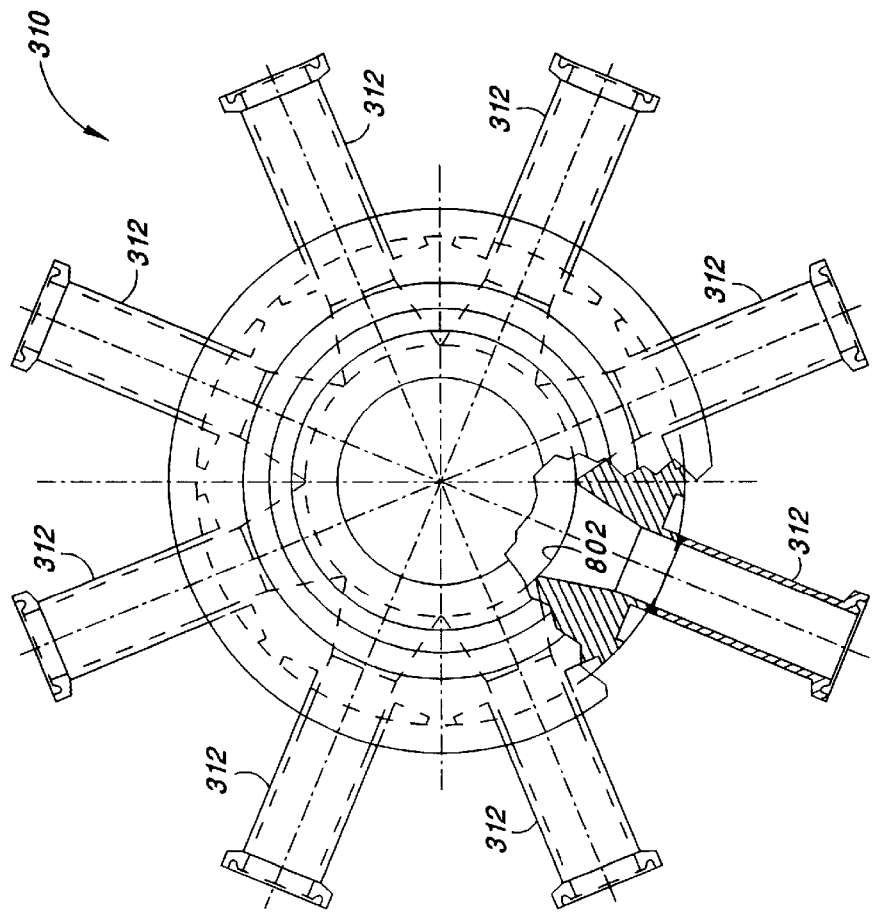
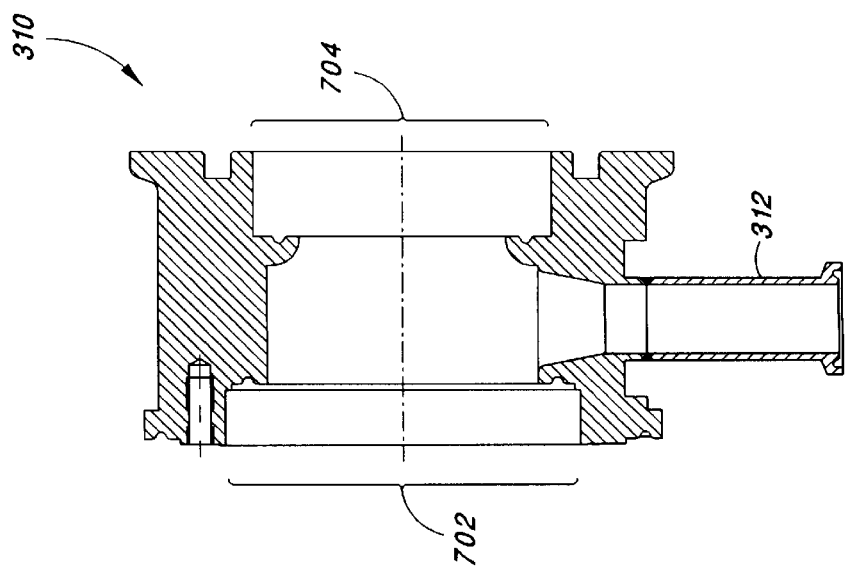

UNIFORM PRODUCT FLOW IN A HIGH-ELECTRIC-FIELD TREATMENT CELL

BACKGROUND OF THE INVENTION

The present invention relates to the deactivation of microorganisms in a high-strength-electric field treatment system, and more particularly to the deactivation of microorganisms in such system wherein uniform flow of a product is effected. Even more particularly, the present invention relates to a treatment system for deactivating microorganisms in which uniform product flow is effected using electrodes with shapes selected to effect such uniform product flow.

As used herein the phrases "deactivating organisms," "deactivate organisms," "deactivation of organisms" and similar phrases refer to the killing or sterilization of living organisms such as bacteria, viruses, fungi, protozoa, parasites and the like.

Substantial technical effort has been directed to the preservation of perishable fluid food products such as milk products, natural fruit juices, liquid egg products, and pumpable meat products, such as ground beef or turkey. Such liquid food products may normally contain a wide variety of microorganisms, and are excellent culture media for such microorganisms, (i.e., are excellent bacteriological growth media).

Practical preservation methods which have found significant commercial application predominantly utilize heat treatment such as pasteurization to inactivate or reduce the microorganism population. For example, milk products are conventionally pasteurized at a minimum temperature of at least about 72° C. for 15 seconds (or equivalent time/temperature relationship) to destroy pathogenic bacteria and most of the nonpathogenic organisms, with degradative enzyme systems also being partially or totally inactivated. However, products processed in this manner are still generally unsterile and have limited shelf life, even at refrigeration temperature.

The shelf life of liquid foodstuffs may be substantially extended by higher heat treatment processes such as "ultra high pasteurization", or "ultra high temperature" ("UHT") treatment. UHT treatment may be at a temperature of 140° C. for four seconds. These processes are used in conjunction with aseptic packaging to achieve complete destruction of all bacteria and spores within the food product, however, such heat treatment typically adversely affects the flavor of the food product, at least partially denatures its protein content or otherwise adversely affects desired properties of the fluid food product.

Other approaches to liquid food preservation, which also have certain disadvantages, include the use of chemical additives or ionizing radiation.

The bactericidal effects of electric currents have also been investigated since the end of the 19th century, with various efforts having been made to utilize electrical currents for treating food products. Such efforts are described in U.S. Pat. Nos. 1,900,509, 2,428,328, 2,428,329 and 4,457,221 and German Patents 1,946,267 and 2,907,887, inter alia, all of which are incorporated herein by reference. The lethal effects of low-frequency alternating current with low electric field strength have been largely attributed to the formation of electrolytic chemical products from the application of current through direct contact electrodes, as well as ohmic heating produced by current flow through an electrically resistive medium. Unfortunately however, the electrolytic chemical products generated by low frequency, low strength electric field methods may be undesirable in fluid foodstuffs, and heating, as noted above, may also cause undesirable effects in the fluid foodstuffs.

As described in U.S. Pat. No. 3,594,115, incorporated herein by reference, lethal effects of high voltage arc discharges have been attributed to electrohydraulic shock waves. The utilization of explosive arc discharges to produce microbiologically lethal shock waves has not found wide-spread application as it is not a very effective means for preserving edible liquid foodstuffs. In addition, such explosive arc discharges can produce undesirable chemical byproducts in the foodstuffs being treated.

More recently, the effect of strong electric fields (or very high strength electric fields) on microorganisms has been studied as a mechanism for reversibly or irreversibly increasing the permeability of the cell membrane of microorganisms and individual cells. The application of very high strength electric fields to reversibly increase the permeability of cells has been used to carry out cell fusion of living cells and to introduce normally excluded components into living cells. Very high strength electric fields in nonnutrient media can also have a direct irreversible lethal effect upon microorganisms with the rate of deactivation dependent upon the field strength above a critical field level and the duration of the applied very high strength electric field.

A pulsed field treatment apparatus, which uses very high strength electric field pulses of very short duration, to deactivate microorganisms in food products is shown in U.S. Pat. Nos. 5,514,391 (the '391 patent); 5,235,905 (the '905 patent); and 5,048,404 (the '404 Patent), issued to Bushnell et al., and U.S. Pat. Nos. 4,838,154 (the '154 patent); and 4,695,472 (the '472 patent), issued to Dunn et al., all of which are incorporated herein by reference. The prevention of electrophoretic and electrochemical effects in these apparatuses is described in U.S. Pat. Nos. 5,393,541 and 5,447,733, issued to Bushnell, et al. (the '541 patent and the '733 patent), both of which are incorporated herein by reference. Generally, in accordance with the these patents, methods and apparatuses are provided for preserving fluid foodstuffs (or pumpable foodstuffs), which are normally excellent bacteriological growth media. Such preservation is achieved by applying very high strength electric field pulses (of at least about 5000 V/cm) of very short duration (of no more than about 100 microseconds) through all of the pumpable foodstuff.

By "pumpable," "liquid," or "fluid" "product" or "foodstuff" is meant a product, such as an edible, food product or other product, having a viscosity or extrusion capacity such that the product may be forced to flow through a treatment zone, e.g., a viscosity of less than about 1000 centipoise. These products include extrudable products, such as doughs or meat emulsions such as hamburger; fluid products such as beverages, gravies, sauces, soups, and fluid dairy products such as milk; food-particulate containing food slurries such as stews; food-particulate containing soups, and cooked or uncooked vegetable or grain slurries; and gelatinous foods such as eggs and gelatins; and other products, such as medical products, water and the like.

By "bacteriological growth medium" is meant that upon storage at a temperature in the range of 0° C. to about 30° C., the product, with its indigenous microbiological population or when seeded with test organisms, will demonstrate an increase in biological content or activity as a function of time as detectable by direct microscopic counts, colony forming units on appropriate secondary media, metabolic end product analyses, biological dry or wet weight or other qualitative or quantitative analytical methodology for monitoring increase in biological activity or content. For example, under such conditions the microbiological population of a pumpable foodstuff that is a bacteriological growth medium may at least double over a time period of two days.

The compositions of typical fluid foodstuffs that are biological growth media, derived from "Nutritive Value of American Foods in Common Units", Agriculture Handbook No. 456 of the U.S. Department of Agriculture (1975), are as follows:

| Fluid Food Product | Water Wt % | Protein Wt % | Fat Wt % | Carbo-hydrate Wt % | Na Wt % | K Wt % |
|---|---|---|---|---|---|---|
| FLUID FOODSTUFFS | | | | | | |
| Whole Milk (3.5% fat) | 87.4 | 3.48 | 3.48 | 4.91 | .05 | .144 |
| Yogurt ** | 89.0 | 3.40 | 1.68 | 5.22 | .050 | .142 |
| Raw Orange Juice | 88.3 | .685 | .20 | 10.0 | .0008 | .2 |
| Grape Juice | 82.9 | .001 | tr. | .166 | .0019 | .115 |
| Raw Lemon Juice | 91.0 | .41 | .20 | 8.0 | .0008 | .14 |
| Raw Grape-fruit Juice | 90.0 | .48 | .08 | 9.18 | .0008 | .16 |
| Apple Juice | 87.8 | .08 | tr. | 11.9 | .0008 | .10 |
| Raw Whole Eggs | 73.7 | 12.88 | 11.50 | .90 | .12 | .13 |
| Fresh Egg Whites | 87.6 | 10.88 | .02 | .79 | .15 | .14 |
| Split pea Soup * | 70.7 | 6.99 | 2.60 | 16.99 | .77 | .22 |
| Tomato Soup * | 81.0 | 1.60 | 2.10 | 12.69 | .79 | .187 |
| Tomato Catsup | 68.6 | 2.0 | .588 | 25.4 | 1.04 | .362 |
| Vegetable beef soup | 91.9 | 2.08 | .898 | 3.9 | .427 | .066 |

* condensed - commercial
** from partially skimmed milk

Very high strength electric fields may be applied by means of treatment cells of high-field-strength design, examples of which are described in detail by Bushnell et al. and Dunn et al. Basically, the foodstuff is, in practice, electrically interposed between a first electrode, and a second electrode. The very high strength electric field is generated between the first and second electrodes such that the very high strength electric field passes through the foodstuff, subjecting any microorganisms therein to the very high strength electric field. Generally, the second electrode consists of a grounded electrode, and a relatively higher or lower voltage potential is applied to the first electrode.

In the Bushnell et al. patents and the Dunn et al. patents, the pumpable fluid foodstuff is subjected to at least one very high strength electric field and current density electrical pulse, and at least a portion of the fluid foodstuff is subjected to a plurality of very high strength electric field and current density pulses, in a high-strength electric pulse treatment zone. In one processing technique, the liquid foodstuff is introduced into a treatment zone, or cell, between two coaxial electrodes that have a parallel configuration adapted to produce a substantially uniform electric field thereinbetween without dielectric tracking or other breakdown.

By "parallel" configuration it is meant that product passes between the electrodes, such that electric flux lines are approximately normal to direction of flow. Using these parallel-configured electrodes, very high strength electric field pulses are applied to the electrodes to subject the liquid foodstuff to multiple pulse treatment by the pulsed field apparatus. In order to generate the very high strength electric field pulses, the pulsed field apparatus employs, for example, a lumped transmission line circuit, a Blumlein transmission circuit and/or a capacitive discharge circuit. Alternatively, the Bushnell et al. patents describe the use of field reversal techniques in capacitive discharge systems (or pulse forming networks) to increase the effective potential across the treatment cell. For example, by applying a short electric field pulse of very high electric field strength (e.g., 20,000 volts per centimeter) across a treatment cell for a short period of time (e.g., 2 microseconds) of one polarity, followed by abrupt reversal of the applied potential within a short time period (e.g., 2 microseconds), an effective field approaching 40 kilovolts per centimeter is achieved across the cell.

If a product is continuously introduced into the treatment zone to which very high strength electric field pulses are periodically applied, and the product is concomitantly withdrawn from the treatment zone, the rate of passage of the product through the treatment zone can be coordinated with the pulse treatment rate so that all of the product is subjected to at least one very high strength electric field pulse within the treatment zone. The product may be subjected to treatment in a sequential plurality of such treatment zones, or cells, such as is described in more detail by Bushnell et al.

High-strength electric field treatment processes employ pulses of high-electric field strength to treat products as they pass between two electrodes. High voltage pulses applied to the electrodes expose the product to the high-strength electric fields. The high-strength electric fields in turn deactivate microorganisms carried by the product. The deactivation of microorganisms depends greatly on peak electric fields, pulse width and energy deposition in a given volume of the product as it flows between the electrodes. During flow between the electrodes, spatial variations in flow velocity with the product lead to variations in energy deposition between various volumes resulting in variations in deactivation affectivity in such volumes within the product being treated. This leads to reduced efficiency in the deactivation process in that over treatment of some volumes becomes necessary to assure a minimum energy deposition in all volumes. Prior art parallel-configured electrode treatment system designs all suffer from the problem of spatial variations in flow velocity and thus, exhibit variations in total energy deposition at various points (i.e., in various volumes) within the product being treated.

FIG. 1 shows one treatment system 100 in accordance with the prior art that exhibits spatial variations in flow velocity. As can be seen, a product enters the treatment system 100 radially through an inlet manifold 102 from one end of the treatment system (to the left as shown) and flows between each of two electrodes 104, 106 toward an outlet port 108 (to the right as shown).

Also shown in FIG. 1 are contour lines 110 showing interfaces between volumes of the product having different flow velocities. The contour lines show spatial variations in flow velocity.

As a result of the spatial variations in flow velocity, various eddy currents and variations in flow uniformity occur. These phenomenon result in non-uniform energy deposition within the product, and fouling of the treatment system, for example, "cooked" product that agglomerates on the electrodes.

FIG. 2 shows another treatment system 200 in accordance with the prior art in which a product flows essentially in an opposite direction (left to right) of that illustrated in FIG. 1. A small inlet pipe 202 (to the left) is a source of product flowing toward and between the electrodes 204, 206 with radial exit pipes in an exit manifold 208 (to the right) collecting the product following treatment.

As the product enters a treatment zone between the electrodes of FIG. 2, flow separation occurs as the product goes around a frustoconical "nose" 212 into the treatment zone between the electrodes 204, 206. This causes a non-uniform velocity distribution in the treatment zone. There is also flow separation that occurs as the product exits the treatment zone (as can be seen in the contour lines) leading to more eddys and more fouling of the treatment system.

Also shown in FIG. 2 are contour lines 210 showing interfaces between volumes of the product having different velocities. The contour lines illustrate the above-mentioned spatial variations in flow velocity.

As a result of the special variations in flow velocity illustrated in FIG. 2, eddy currents form and variations in flow uniformity occur causing fouling problems due to over-treated product and built up heat.

The present invention advantageously addresses the above and other needs.

SUMMARY OF THE INVENTION

The present invention advantageously addresses the needs above as well as other needs by providing an approach for the deactivation of microorganisms in a high-strength-electric field treatment system, and more particularly to the deactivation of microorganisms in such system wherein uniform flow of a product is effected.

In one embodiment, the present invention can be characterized as an apparatus for reducing microorganism levels in products. The apparatus has an inlet tube of substantially uniform cross-sectional area extending from a distance of at least twice an average diameter of the inlet tube before a treatment zone to at least into the treatment zone; a substantially ogival electrode nose positioned in the treatment zone; and an outer electrode forming an interior of the inlet tube in the treatment zone.

The term "ogival", as herein used, means shape generally consisting of an intersection of two curves. This shape may be described as a "bullet-shaped" intersection of two curves that each have the same radius of curvature. For purposes herein, the term "ogival" is not limited to shapes in which the radius of curvature is independent of angle, i.e., the radius may be a function of angular position about the curve, such that the curve is not necessarily a circular arc. In three dimensions, an ogive is obtained by tracing the figure formed by the intersecting curves when a two-dimensional ogive is rotated about its major axis, i.e., the axis passing through the intersection of the curves and being equidistant from each of the curves.

In another embodiment, the present invention can be characterized as a method for reducing microorganism counts in a product. The method has steps of flowing the product through an inlet tube of substantially uniform cross-sectional area extending from a distance of at least twice an average diameter of the inlet tube before a treatment zone, to at least into the treatment zone; flowing the product between a substantially ogival electrode nose positioned in the treatment zone, and an outer electrode forming an interior of the inlet tube in the treatment zone; and applying at least one high strength electric field pulse to the product during transit through the treatment zone.

BRIEF DESCRIPTION OF THE DRAWINGS

The above and other aspects, features and advantages of the present invention will be more apparent from the following more particular description thereof, presented in conjunction with the following drawings wherein:

FIG. 7 is a cross-sectional view of an exit manifold of the treatment system of FIG. 3;

FIG. 8 is an end view of the exit manifold of FIG. 7;

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
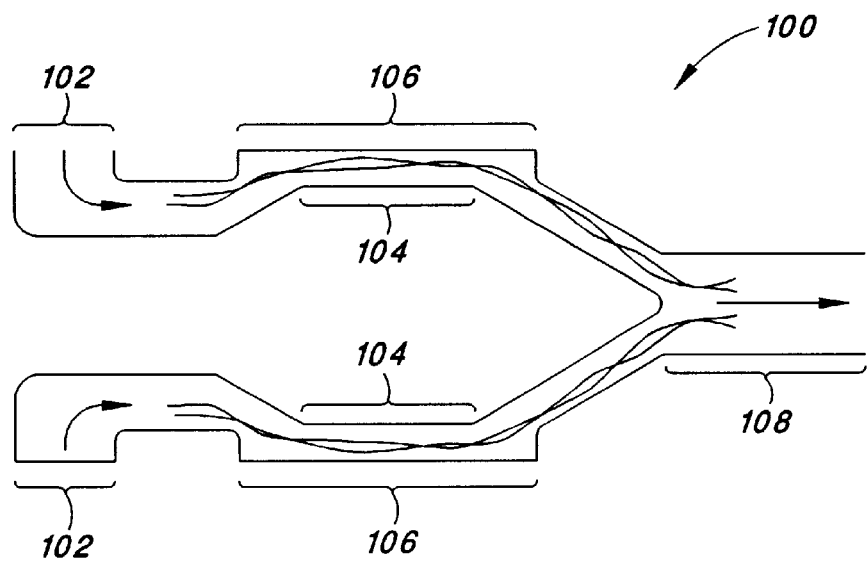
FIG. 1 is a partial cross-sectional view of a high-strength, electric field treatment system of the prior art.

Referring first to FIG. 1, a partial cross-sectional view is shown of a high-strength electric field treatment cell 100 of the prior art.

As can be seen, a fluid (i.e., pumpable) product enters the treatment system radially from a small-diameter inlet manifold 102 at one end of the treatment cell 100 (to the left as shown) and flows into a treatment zone between each of two electrodes 104, 106 toward an outlet port (to the right as shown). Also shown are contour lines 110 showing interfaces between volumes of the product having different flow velocities.

As a result of the spatial variations in flow velocity, various eddy currents and variations in flow uniformity occur. Unfortunately, these phenomenon result in non-uniform energy deposition within the product, and thus potentially fouling of the treatment system, for example, "cooked" product agglomerating on the electrodes, and possible damage to the product, e.g., flavor, texture or color changes.

Figure 2:
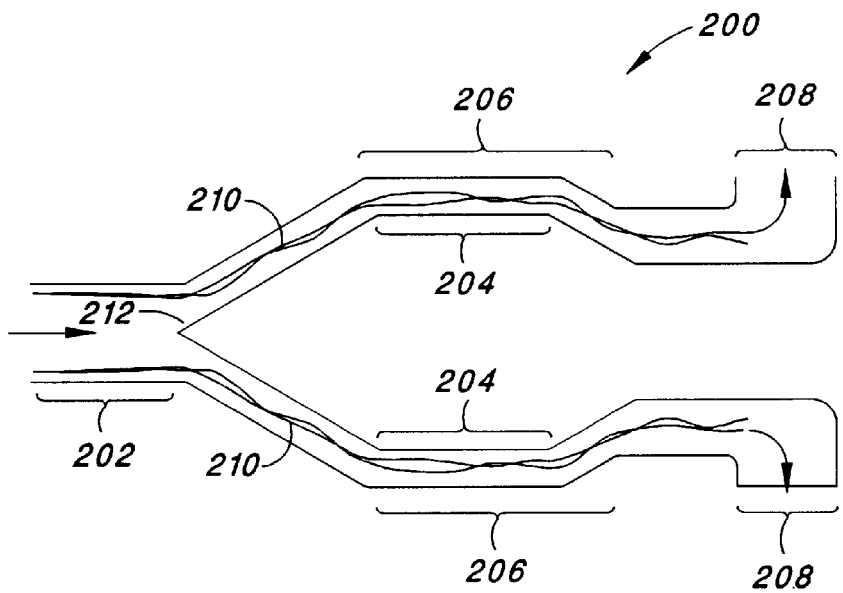
FIG. 2 is a partial cross-sectional view of another high-strength, electric field treatment system of the prior art.

Referring next to FIG. 2, a partial cross-sectional view is shown of another high-strength-electric field treatment cell 200 of the prior art.

A small inlet pipe 202 (to the right) is a source of product flowing toward and between the electrodes 204, 206 in a treatment zone, and radial exit pipes come together and form an exit manifold 208 (to the left) that deflects the product flow radially outward (away from the electrodes 204, 206 and the treatment zone) following treatment. Also shown are contour lines 210 showing the interfaces between volumes of the fluid product having different velocities.

As the product enters the treatment zone between the electrodes 204, 206, flow separation occurs as the product goes around a frustoconical "nose" 212 of a center electrode 204. This causes a non-uniform velocity distribution within the fluid product in the treatment zone. There is also flow separation that occurs as the fluid product exits the treatment zone due to non-uniformities in flow path, corners within the flow path and the like. As can be seen in the contour lines this additional flow separation leads to more eddys and more fouling of the treatment system.

As a result of the special variations in flow velocities illustrated in FIG. 2, eddy currents form and variations of flow uniformity occur potentially causing fouling problems due to overtreated product and built up heat, and potentially causing flavor changes, texture changes and color changes in the fluid product being treated.

Figure 3:
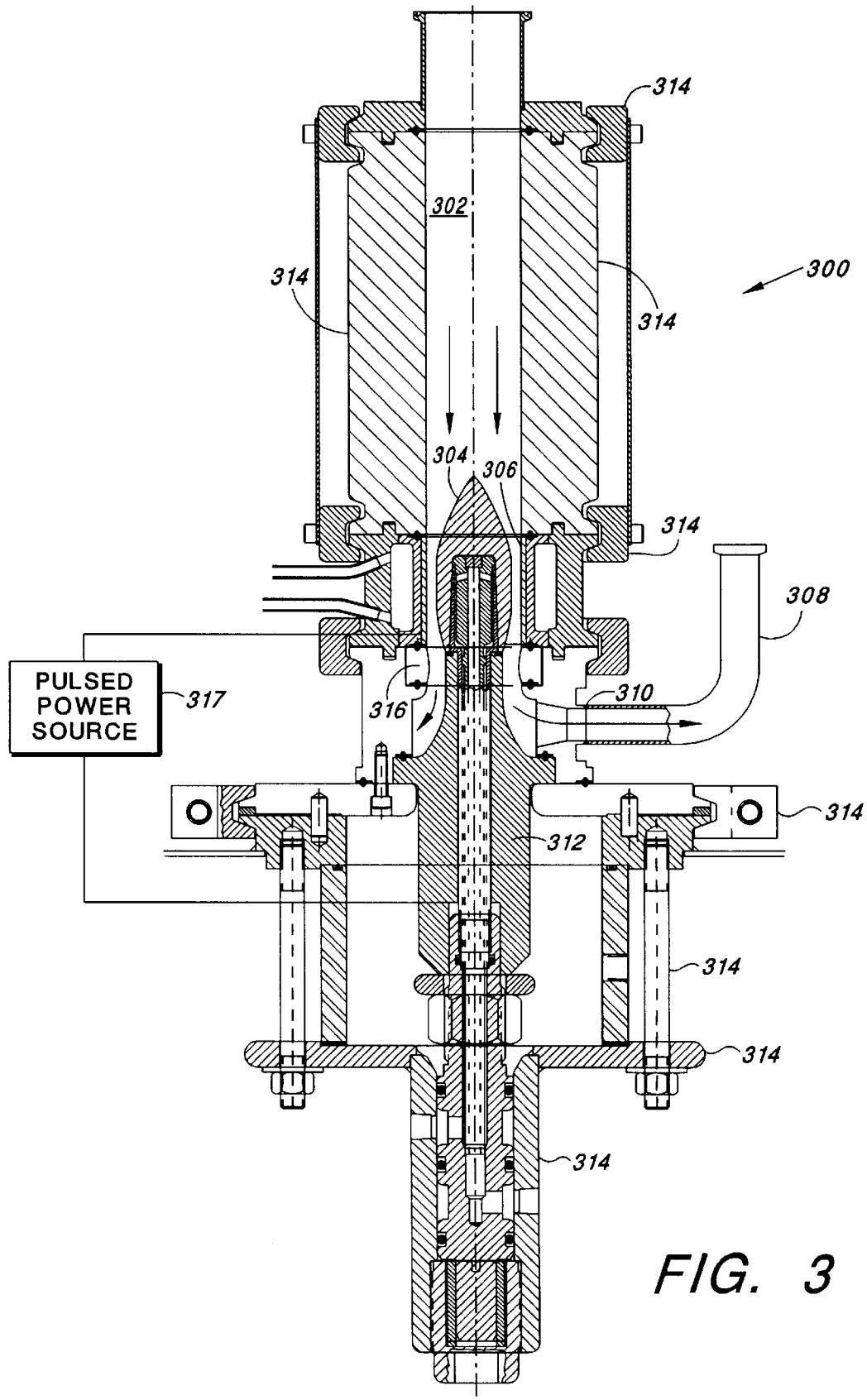
FIG. 3 is a cross-sectional view of a high-strength, electric field treatment system in accordance with the present invention.

Referring next to FIG. 3, a cross-sectional view is shown of a high-strength-electric field treatment system 300 in accordance with the present invention.

Shown is a large diameter inlet pipe 302, a shaped electrode 304 in accordance with one embodiment of the present invention, an outer cylindrical electrode 306, radial outlets and outlet pipes 308 of an exit manifold 310, an insulator body 312, various supporting hardware structures 314 that both mechanically and electrically provide integrity to the treatment system 300, and an insulating ring 316 that separates the exit manifold 310 from the center insulator. Also shown is a pulsed power source 317 that supplies high voltage pulses across the electrodes, thus forming a high electric field environment between the electrodes. The electric field generated by the pulsed power source is preferably at least about 5000 V/cm, in electric field strength, and of a duration of no more than about 100 microseconds.

In order to achieve microorganism deactivation (or inactivation), in the treatment system of FIG. 1, a switch (or switching device) within the pulsed power source 317 configures a charge supply circuit within the pulsed power source 317 so as to deliver a high voltage pulse across the electrodes 304, 306. A controller within the pulsed power source 317 is coupled to a switch within the pulsed power source 317 and controls the switch to assume states, which result in the application of the high voltage pulses across the electrodes. The controller may assume a variety of known forms including a simple timing circuit, or a complex digital or analog computer system, e.g., a personal computer.

Of significance in the treatment system 300 shown, the inlet pipe 302 is of constant diameter from a distance well before the shaped electrode 304 into the treatment zone between the electrodes 304, 306. This distance is preferably at least twice the diameter of the inlet pipe 302, and even more preferably at least ten times the diameter of the inlet pipe 302. This is in contrast to the prior art approaches of FIGS. 1 and 2, which employ a small diameter inlet pipe that tapers to a larger diameter at the treatment zone.

The constant inlet pipe diameter of the present embodiment permits a flow of fluid product down the inlet pipe 302 to reach a uniform parabolic velocity profile before it reaches the shaped electrode 304. As the parabolic flow of fluid product reaches the shaped electrode 304, the parabolic flow is converted to plug flow as a result of fluid resistances created by the shaped electrode 304.

Advantageously, as the plug flow of fluid product passes a "nose" of the shaped electrode 304, the plug flow is maintained as the fluid product passes into the treatment zone between the electrodes 304, 306. This plug flow is preferably maintained through the treatment zone, past the electrodes 304, 306, and then toward the exit manifold 310. Advantageously, uniform plug flow of the fluid product is maintained, or maximized, throughout the treatment zone, between the electrodes 304, 306, thus preventing, or minimizing, the formation of eddy currents and, flow non-uniformities. As a result, uniform energy deposition within the fluid product is achieved.

Unlike prior art approaches to high electric field treatment cell or chamber design, the present embodiment avoids non-uniform energy deposition and its attendant problems through the use of a uniform fluid product flow, i.e., by creating a plug flow of fluid product, i.e., maximizing plug flow throughout the treatment chamber. Inherently, prior art cell designs lack this uniform product flow and therefore lack the present embodiment's ability to achieve uniform or nearly uniform energy deposition within the fluid product being treated.

By way of comparison to flow in the present embodiment, as material flows through a conduit of continuous cross-section such as a cylindrical pipe, velocity of individual volume elements varies depending on the position within the pipe. For example, water, under laminar flow conditions, will develop a nearly parabolic flow profile in such a pipe, where velocity on a centerline of the pipe is nearly twice the average velocity in the pipe. Due to drag at wall surfaces, velocity near the walls is zero. Flow profiles of other products depend on viscosity and shape of the pipe but generally resemble parabolic flow. Significantly, the theoretical parabolic (or near parabolic) profile in a conduit such as a cylindrical pipe is only obtained at sometime after any disturbance, such as a change in direction (elbow), or obstruction, or change in size of the pipe. For water, for example, this theoretical parabolic or near parabolic profile will be achieved at approximately 10 times the diameter distance down the pipe.

A simple frustoconical electrode "nose" such as is shown in FIG. 2, causes a very irregular flow profile due to the shape of the electrode "nose" and the fact that flow is being accelerated by the presence of the inner electrode 204 (FIG. 2) due to the fact that cross-sectional area "seen" by the fluid product is decreased as the fluid product progresses toward the treatment zone. Further, the small inlet pipe 202 that expands quickly at the electrode "nose" tends to contribute to this accelerating effect, and further non-uniformities in fluid product flow result.

In addition to the non-uniformity of treatment caused by the wide variation in flow velocity in the embodiment of FIG. 2, dead spots in the region of the high-electric field (i.e., the treatment zone) result in portions of the fluid (i.e., pumpable) product being significantly over treated, resulting in excessive heating and possible fouling of electrode surfaces.

By employing the teachings of the present embodiment, which involve a uniform shape along the input conduit, a change in the shape of the upstream side of the electrode (i.e., electrode "nose"), as compared to prior approaches, to a more "nose cone" like shape (also referred to as a substantially ogive-like shape, meaning having a cross-sectional shape defined by an intersection of two convex curves that intersect forming a tip of the ogive), maintaining a constant outer electrode shape (in the present embodiment, cylindrical), and employing an inlet pipe of constant diameter (in the present embodiment, cylindrical) at least leading up to and preferably having the outer electrode through the treatment zone between the electrodes, improved flow patterns are observed, i.e., uniform plug flow patterns are observed.

This improvement in flow patterns within the treatment system 300 occurs in two ways: first, flow distribution is more uniform in that "bouncing" between electrodes by the fluid product is not observed, and second a velocity profile across the gap (treatment zone) between the electrodes is nearly flat (i.e., is a plug velocity flow profile). Thus, the present embodiment represents a significant improvement in flow velocity profile and flow distribution over prior approaches, which addresses a significant defect present in the prior art.

Figure 4:
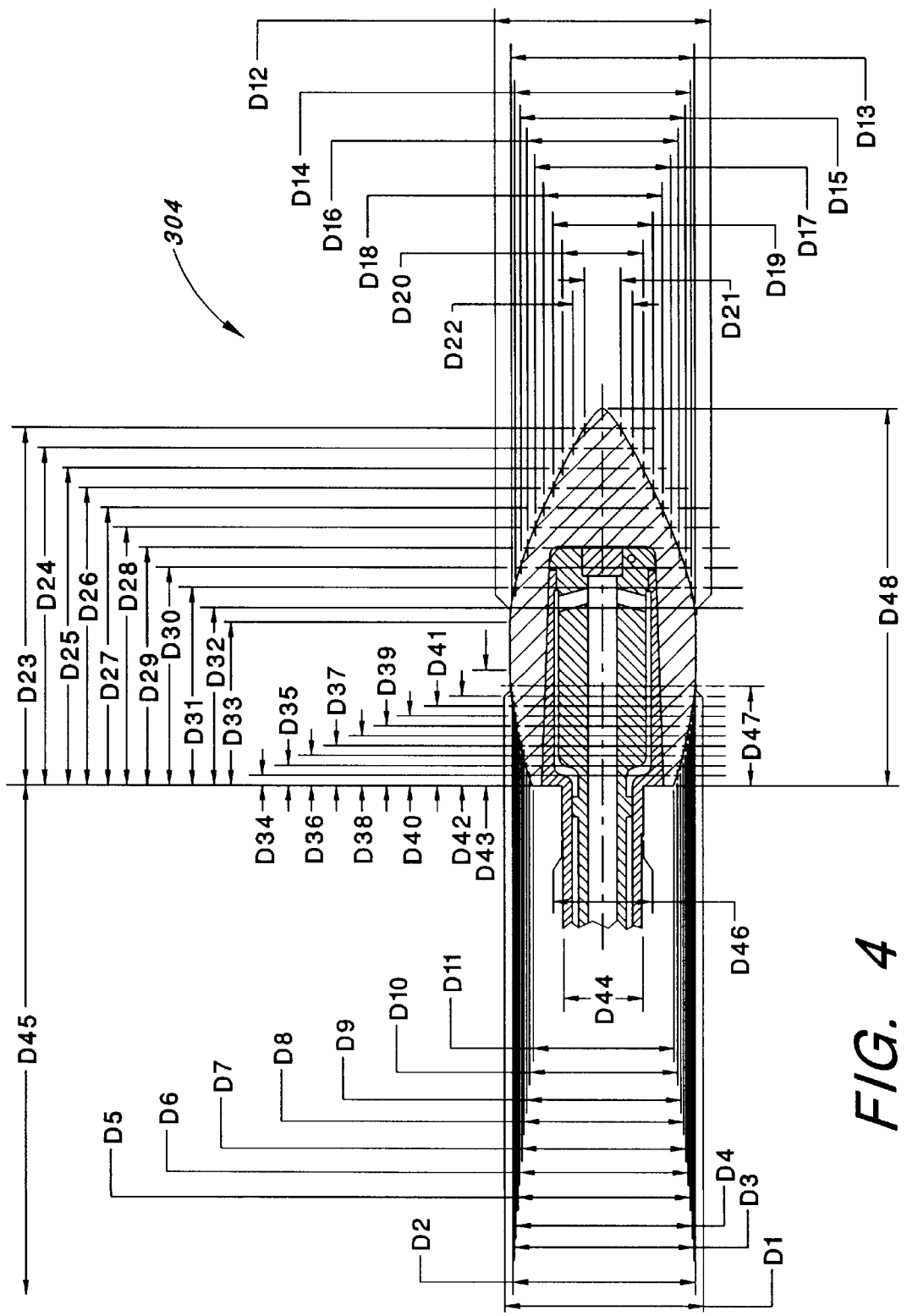
FIG. 4 is a partial cross-sectional view of a center electrode of the treatment system of FIG. 3.

Referring next to FIG. 4, a partial cross-sectional view is shown of a "nose" portion of a center electrode of the treatment system of the present embodiment. As can be seen, the "nose" portion of the center electrode has a substantially ogive-like (or ogival) shape. As can be seen, this shape, viewed in cross-section, is formed as the intersection of two convex curves that meet at a tip of the ogive. The ogive shaped electrode is substantially uniform in shape rotated about a major axis of the ogive shaped electrodes, so as to form a somewhat bullet-like electrode tapering out from the tip to a maximum radius near centerline of the "nose" portion of the center electrode and then tapers slightly back toward the major axis past the centerline of the "nose" portion of the center electrode. Beyond this slight back taper, a center insulator is sealed to the "nose" portion of the center electrode. (see FIG. 6)

Below is a table of exemplary dimensions that correlates with the reference indicators D1 through D48 of FIG. 4.

| REFERENCE | DIMENSIONS IN MILLIMETERS (Standard "Nose" Length) | DIMENSIONS IN MILLIMETERS (Reduced "Nose" Length) |
| --- | --- | --- |
| D1 | 36.80 | 36.80 |
| D2 | 36.41 | 36.41 |
| D3 | 35.85 | 35.85 |
| D4 | 35.16 | 35.16 |
| D5 | 34.40 | 34.40 |
| D6 | 33.60 | 33.60 |
| D7 | 32.76 | 32.76 |
| D8 | 31.83 | 31.83 |
| D9 | 30.77 | 30.77 |
| D10 | 29.54 | 29.54 |
| D11 | 28.09 | 28.09 |
| D12 | 37 ± .1 | 37 ± .1 |
| D13 | 36.60 | 36.60 |
| D14 | 35.13 | 35.13 |
| D15 | 32.93 | 32.93 |
| D16 | 30.22 | 30.22 |
| D17 | 27.11 | 27.11 |
| D18 | 23.69 | 23.69 |
| D19 | 20 | 20 |
| D20 | 16.07 | 16.07 |
| D21 | 7.17 | 7.17 |
| D22 | 11.85 | 11.85 |
| D23 | 83.37 | 71.37 |
| D24 | 79.37 | 67.37 |
| D25 | 75.37 | 63.37 |
| D26 | 71.37 | 59.37 |
| D27 | 67.37 | 55.37 |
| D28 | 63.37 | 51.37 |
| D29 | 59.37 | 47.37 |
| D30 | 55.37 | 43.47 |
| D31 | 51.37 | 39.37 |
| D32 | 47.37 | 35.37 |
| D33 | 44.50 | 32.50 |
| D34 | 2 | 2 |
| D35 | 6 | 6 |
| D36 | 4 | 4 |
| D37 | 10 | 10 |
| D38 | 8 | 8 |
| D39 | 14 | 14 |
| D40 | 12 | 12 |
| D41 | 18 | 18 |
| D42 | 16 | 16 |
| D43 | 23.22 | 23.22 |
| D44 | Ø15.75 | Ø15.75 |
| D45 | 259.2 | 259.2 |
| D46 | 16.25 ± 0.05 | 16.25 ± 0.05 |
| D47 | 20 | 20 |
| D48 | 87.37 | 75.37 |

These dimensions deliver the ogive shape of a specific example of the "nose" portion of the center electrode, and specifically defines uniform convex curved surfaces that come together at a tip, increase to a maximum radius at a centerline and then decrease beyond the centerline.

Thus, a specific example is shown of an ogival "nose" portion of the center electrode having a favorable flow profile when used in combination with the treatment system of FIG. 3. The ogival center electrode shown, in combination with the constant diameter inlet and outer electrodes serve to produce the uniform flow characteristics referred to above. Numerous variants of the embodiment shown in FIG. 3 are intended within the scope of the embodiments described herein and are well within the skills possessed by the skilled artisan.

Figure 5:
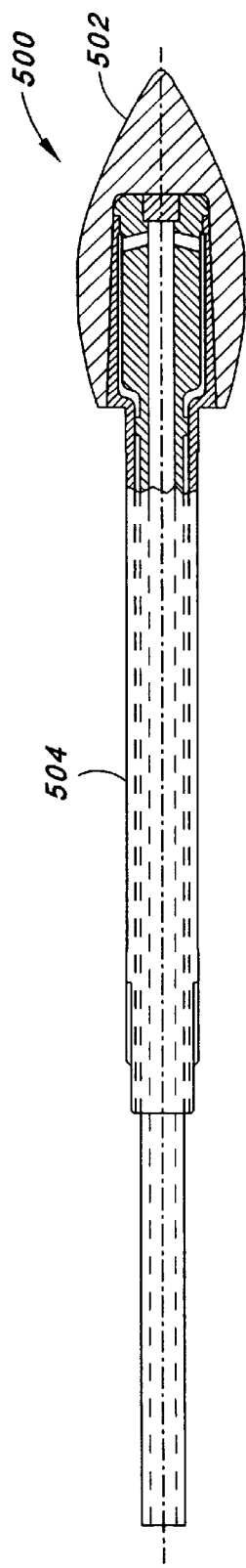
FIG. 5 is a cross-sectional view of the center electrode of FIG. 4.

Referring next to FIG. 5, a cross-sectional view is shown of the center electrode 500 of the present embodiment.

As can be seen, the ogival "nose" portion of the center electrode (electrode nose 502) is ogival in shape with a long metallic shaft 504 attached thereto providing an electrical conduit for conducting electrical pulses between a power supply and the ogival electrode nose 502. Appropriate power supplies are described in U.S. Pat. Nos. 4,695,472 and 4,838,154 of Dunn, et al., and U.S. Pat. Nos. 5,048,404, 5,393,541, 5,447,733 and 5,514,391 of Bushnell, et al., all of which are incorporated herein by reference.

Figure 6:
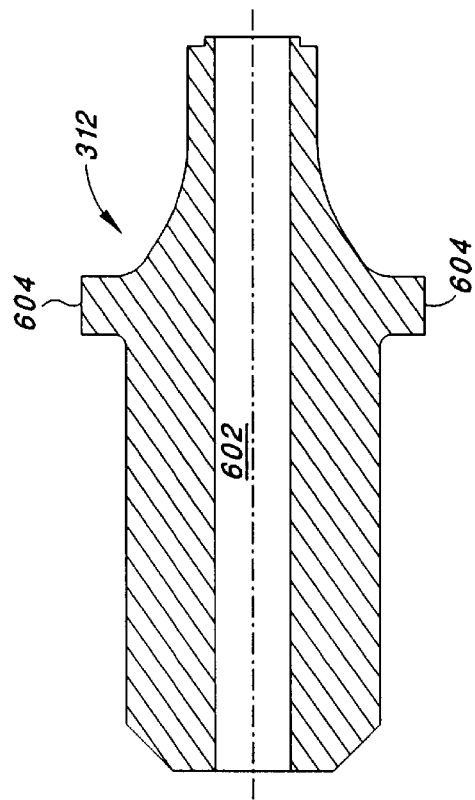
FIG. 6 is a cross-sectional view of a center insulator of the treatment system of FIG. 3.

Referring next to FIG. 6, a cross-sectional view is shown of a center insulator 600 of the treatment system of the present embodiment. In practice the center insulator is slid over the long shaft 504 of the center electrode 500 and hermetically sealed to a rear edge of the ogival electrode "nose" 502 using conventional means, such as an O-ring. As a result of this hermetic sealing, the exposed surfaces of the center electrode 500 and the center insulator 600 form a smooth hermetic flow surface against which the fluid product flows within the treatment cell.

As can be seen, the center insulator 312 includes a cylindrical passage 602 through its center through which the long shaft 504 of the center electrode 500 passes. A flange 604 on the center insulator 312 separates a surface of the center insulator against which the fluid product flows after leaving the treatment zone, as the fluid product flows into the exit manifold, from a remainder of the center insulator 312. The primary function of the center insulator is to increase a surface distance between the ogival "nose" of the center electrode and the cylindrical electrode so as to reduce the possibility of tracking (arcing) between the electrodes along the center insulator surface.

Referring next to FIG. 7, a cross-sectional view is shown of an exit manifold 310 of the treatment system of the present embodiment.

An exit conduit (or pipe) 312 is shown extending radially outward from the exit manifold. A cavity 702 in which the flange 604 of the center insulator 312 seats is shown, as is a cavity 704 in which an insulating ring 316 seats when the treatment system is assembled. The insulating ring 316 separates the exit manifold 310 from the cylindrical electrode 306.

Referring next to FIG. 8, an end view is shown of the exit manifold 310 of the present embodiment.

As can be seen, a plurality of exit pipes 312 emanate in a starlike pattern from the exit manifold 312 so as to achieve a substantially uniform radial exit flow of fluid product from the treatment cell. Openings of the exit conduit 310 are tapered (as best illustrated in partial cross-section at one of the exit pipes of FIG. 8) so that they connect along a circumference of a circular cross-section 802 to each of the exit pipes 312 so as to assure that fluid proceeding in any radial direction as it exits the treatment chamber is directed to an exit pipe 312. The exit manifold 310 holds each of the exit pipes 312 in place, providing structural stability to the downstream end of the treatment chamber as well as redirecting fluid flow.

Figure 9:
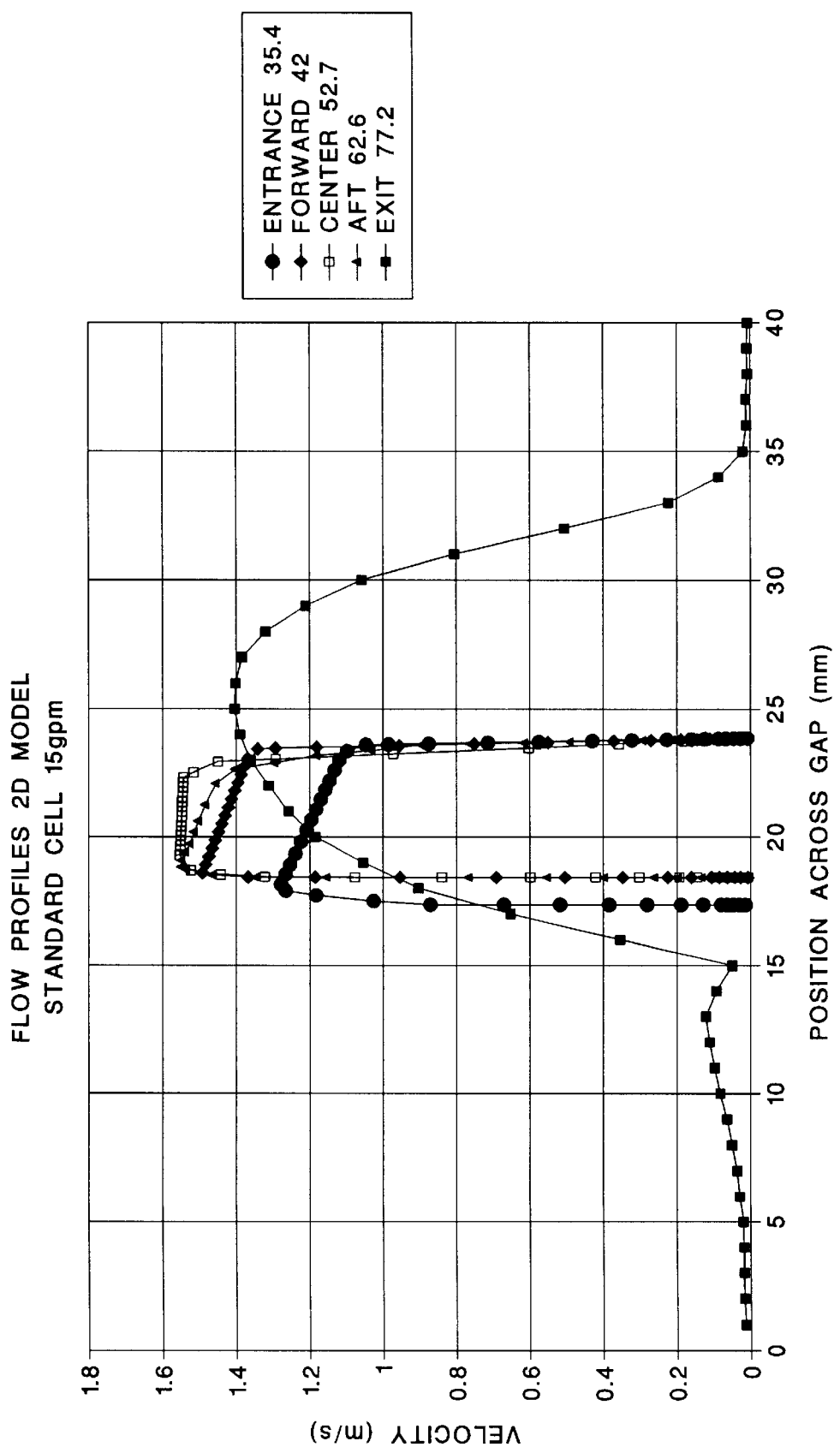
FIG. 9 is a superposition of several graphs taken at various points along the treatment system of FIG. 3 of fluid product velocity on a vertical axis versus position across a gap (or treatment zone) between electrodes on a horizontal axis for a flow rate of 15 gallons per minute.

Referring next to FIG. 9, a superposition is shown of several graphs taken at various points along the treatment system of FIG. 3 of fluid product velocity on a vertical axis versus position across the treatment chamber (or cell) between the electrodes 304, 306 on a horizontal axis. For the graphs shown, a flow rate is 15 gallons per minute.

The graphs shown are generated using computational fluid dynamics techniques modeled on a computer system. Such modeling is performed in two dimensions as angular uniformity is present over most of the treatment chamber of the present embodiment, an exception being in the exit manifold. The graphs represent a velocity of water as a function of position across the treatment cell between the center electrode 304 and the cylindrical electrode 306. Each graph represents a different position along a longitudinal center axes of the treatment chamber.

In polar coordinates, a three-dimensional model assumes that flow is the same azimuthally, so that no variation as a function as angle is accounted for in the graphs of FIG. 9.

An x axis, or horizontal axis, is along a radius position r of the embodiment of FIG. 3, and represents a position across the treatment zone between the electrodes 304, 306. A y axis, or vertical axis, represents velocity. The superimposed graphs shown represent flow profiles at various station points along the ogival "nose" portion of the center electrode, which has a length of approximately 75.37 millimeters, and at an entrance to the treatment cell and at the exit manifold. As mentioned above, a flow rate of 15 gallons per minute is used in the example of FIG. 9. Station points both before and after the treatment zone are shown.

As can be seen, a relatively flat flow profile is present at each station point with the exception of at the exit (i.e., at the exit manifold), which is past the treatment zone between the electrodes and thus of less concern from the perspective of maintaining uniform energy deposition because no treatment occurs at the exit manifold.

Figure 10:
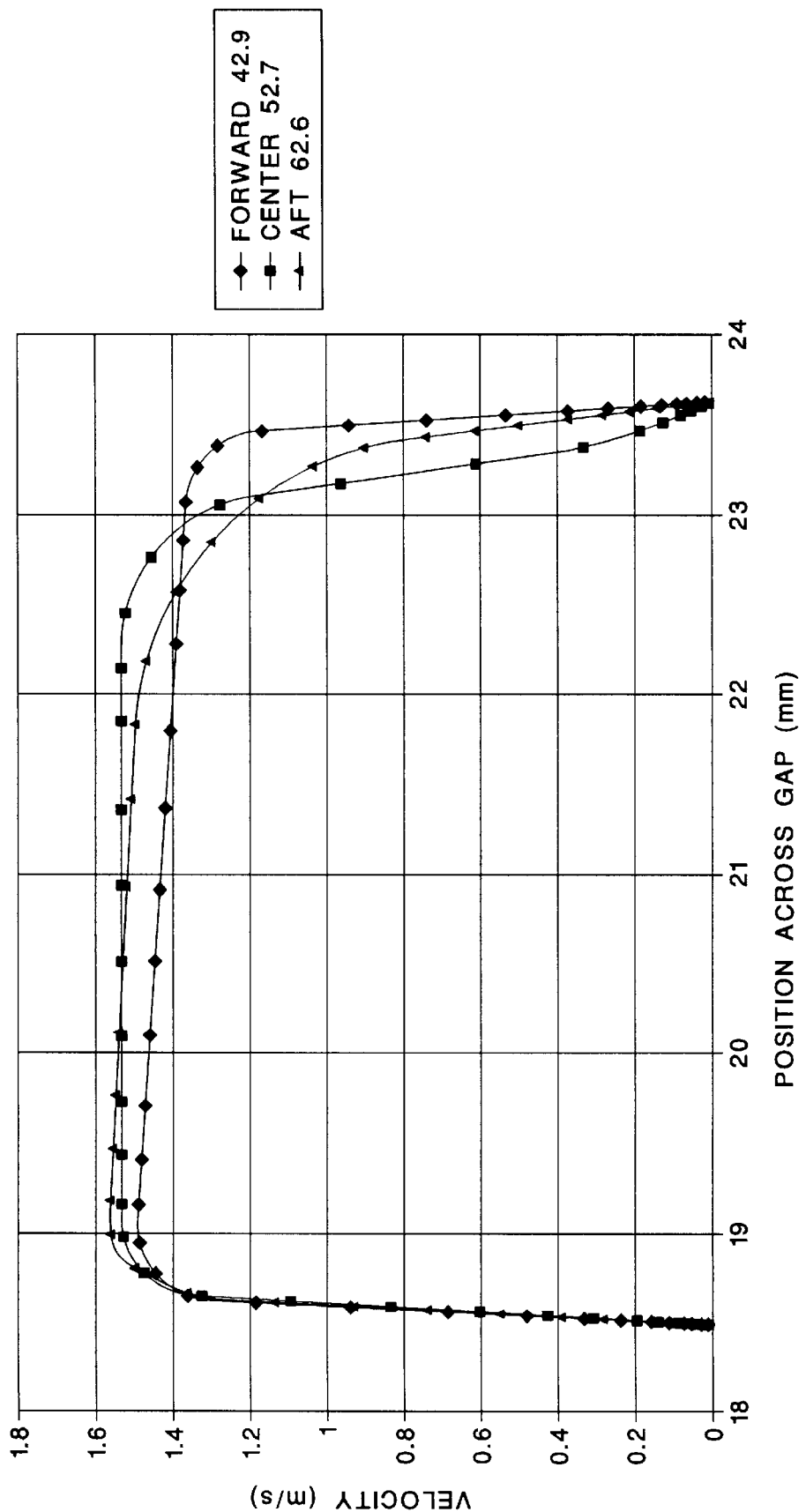
FIG. 10 is a superposition of a few of the several graphs of FIG. 9 over a narrower range of positions across the treatment zone.

Referring next to FIG. 10, a superposition is shown of a few of the several velocity profile graphs of FIG. 9 over a narrower range of positions along the ogive-shaped "nose" portion of the center electrode of the treatment cell within the treatment zone between the electrodes. The relatively flat velocity profiles achieved with the embodiment disclosed herein are particularly evident. The graph shown is similar to that shown in FIG. 9 except that only points in the treatment zone (i.e., between the electrodes 304, 306) are depicted. The flat velocity profiles achieved are indicative of the uniform flow profile within the embodiments described herein. As a result of these flat velocity profiles relatively uniform energy deposition is achieved within the fluid product, and therefore over-treatment, "cooking", under treatment electrode fouling and the like are eliminated or greatly reduced in the embodiments illustrated.

Figure 11:
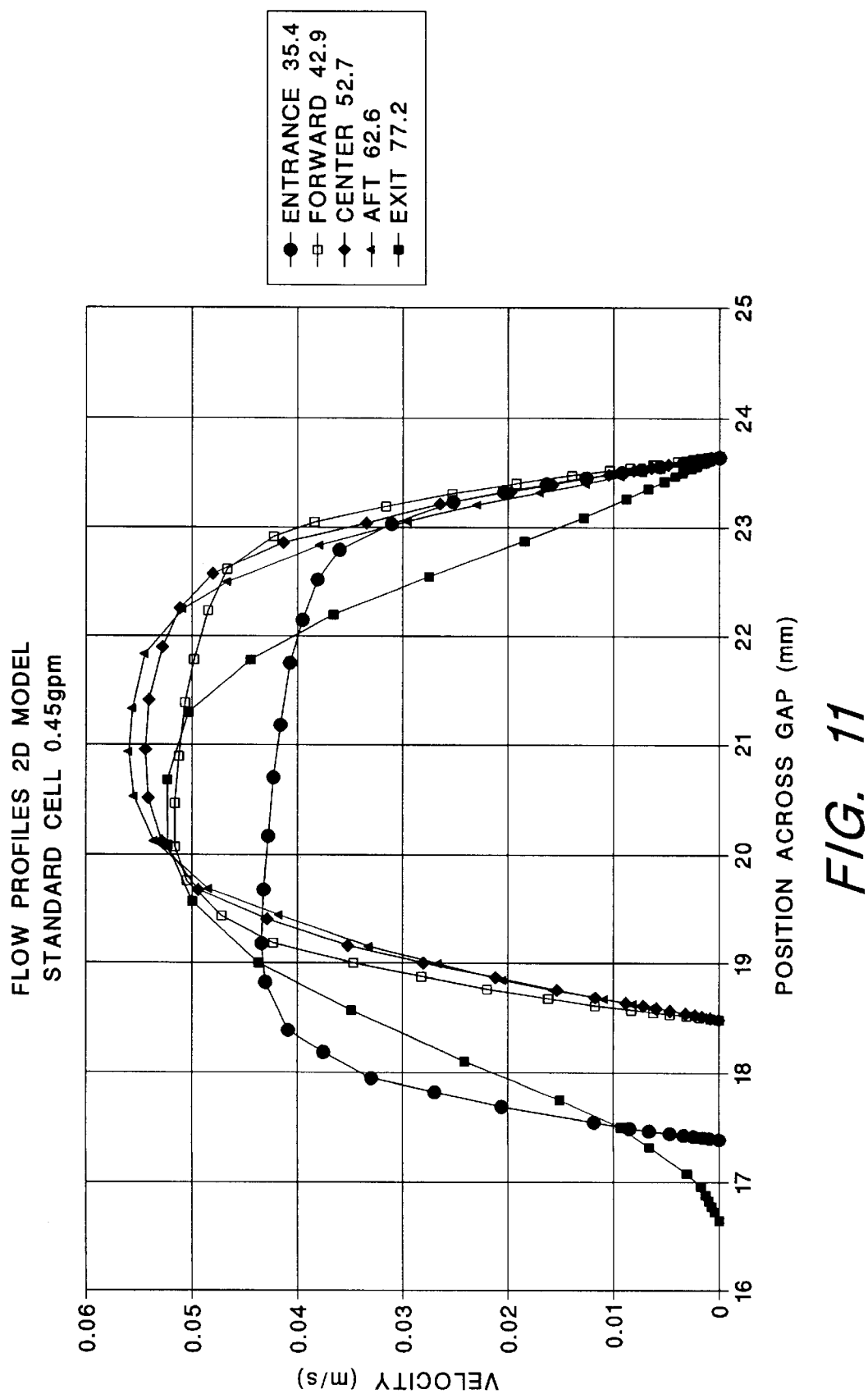
FIG. 11 is a superposition of several graphs taken at various points along the treatment system of FIG. 3 of fluid velocity on a vertical axis versus position across the treatment zone between electrodes on a horizontal axis for a flow rate of 0.45 gallons per minute.

Referring next to FIG. 11, a superposition is shown of several velocity profile graphs taken at various station points along the treatment system of FIG. 3 of fluid velocity on a vertical axis versus position across the treatment zone between the electrodes 304, 306 on a horizontal axis. In the graphs illustrated, a flow rate of 0.45 gallons per minute is utilized.

The graph is similar to that shown in FIG. 9 except that the slower flow rate of 0.45 gallons per minute is modeled. The relatively flat and constant flow profile is also evident in the graph of FIG. 11, although the velocity profile is slightly less flat than for the 15 gallon per minute model, but still represents a significant improvement over the velocity profile seen in the designs of FIGS. 1 and 2.

Figure 12:
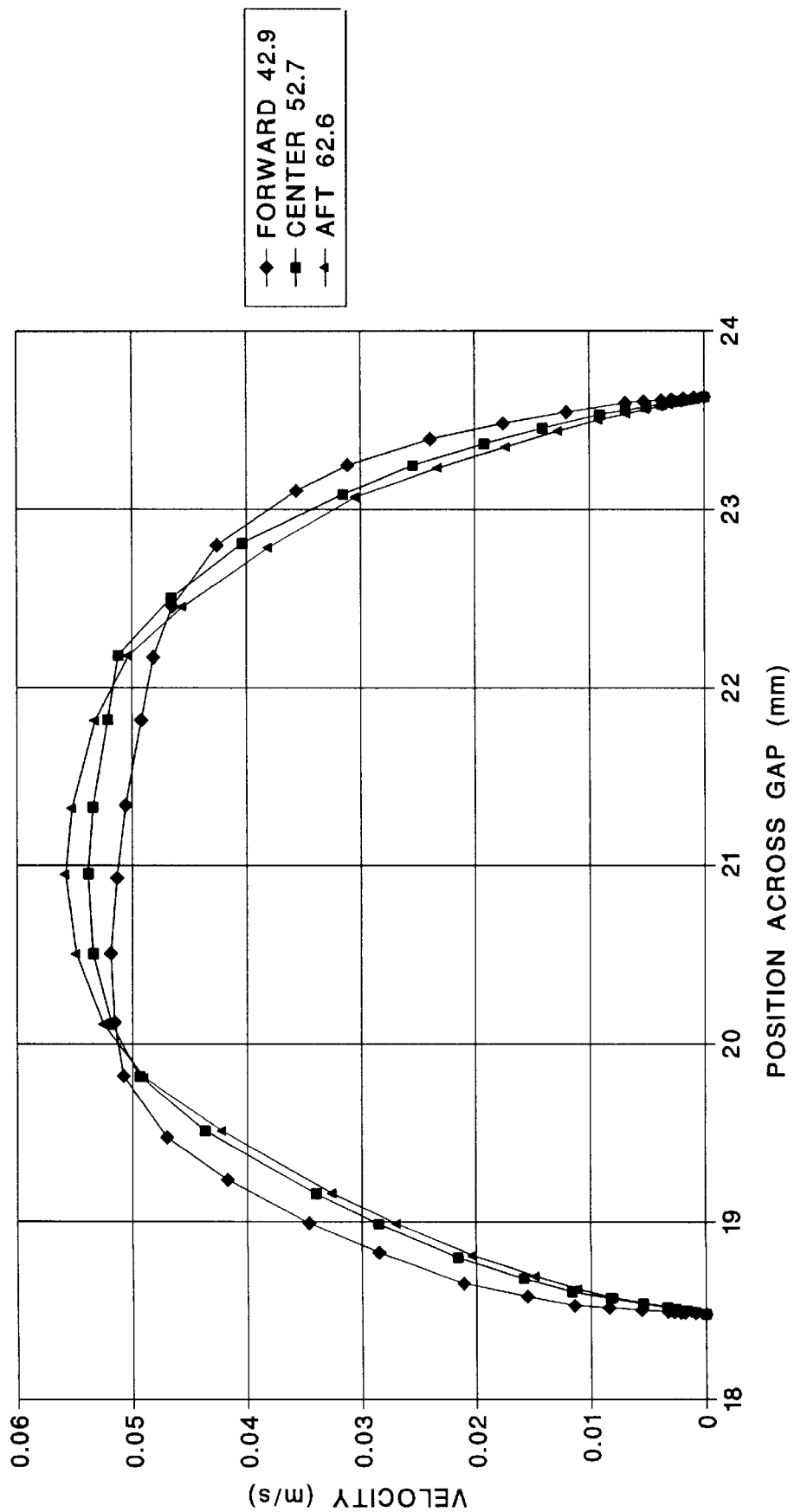
FIG. 12 is a superposition of a few of the several graphs of FIG. 11 over a narrower range of positions across the treatment zone.

Referring next to FIG. 12, a superposition is shown of a few of the several graphs of FIG. 11 over a narrower range of positions across the ogival "nose" of the center electrode of the treatment zone. The graph shown is similar to that shown in FIG. 10 except that the graph depicts points in the graph of FIG. 11 that are within the treatment zone between the electrodes.

Figure 13:
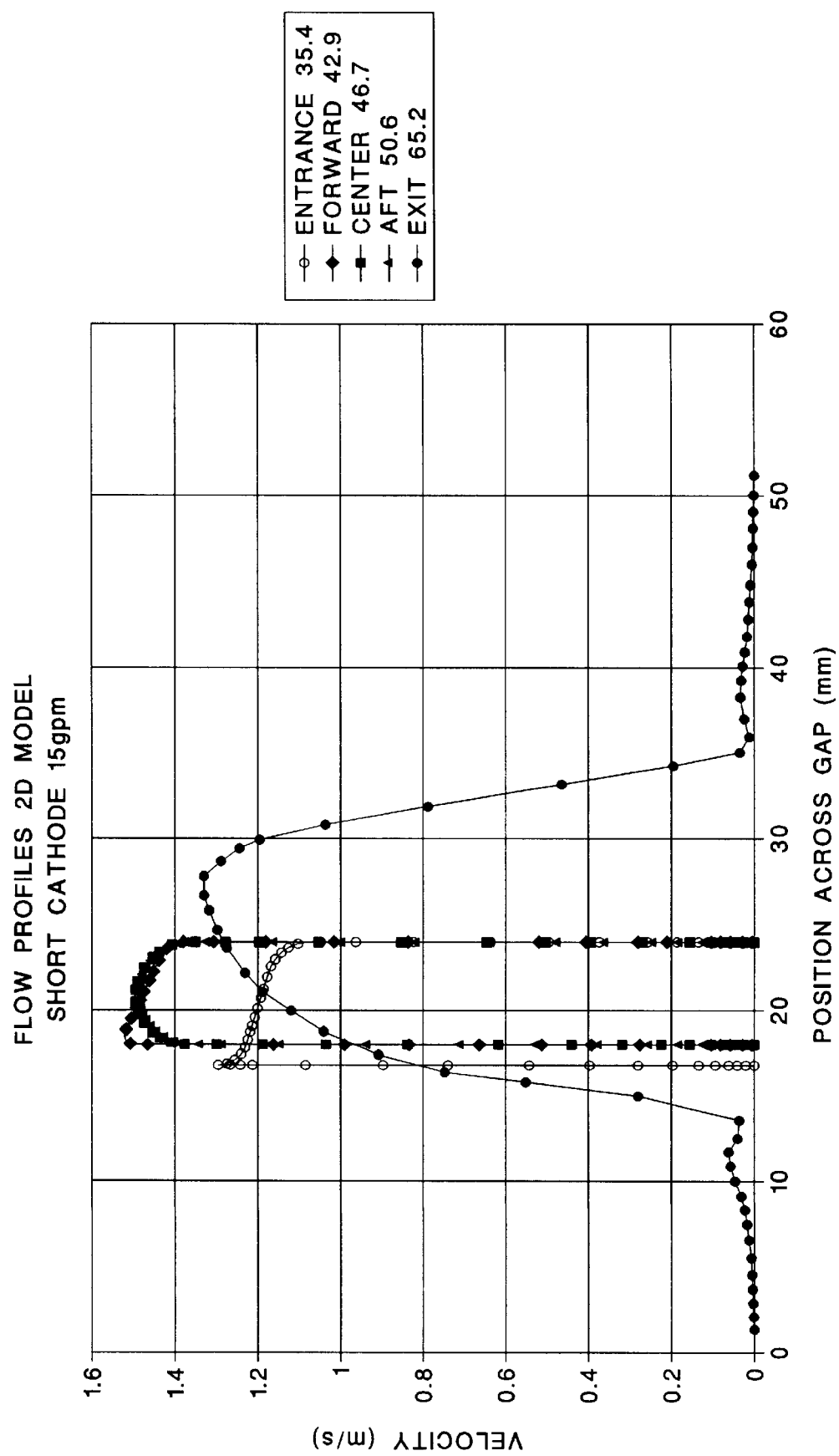
FIG. 13 is a superposition of several graphs taken at various points along a variation of the treatment system of FIG. 3 of fluid velocity on a vertical axis versus position across the treatment zone between electrodes on a horizontal axis for a flow rate of 15 gallons per minute.

Referring next to FIG. 13, a superposition is shown of several velocity profile graphs taken at various station points along a variation of the treatment system of FIG. 3 the present embodiment of fluid velocity on a vertical axis versus position across the treatment zone between the electrodes 304, 306 on a horizontal axis for a flow rate of 15 gallons per minute.

A treatment chamber of reduced ogival "nose" portion length or the center electrode, i.e., of 63.37 millimeters in length, is modeled. The ogival "nose" portion is reduced in length by about 12 millimeters as compared to the embodiment described above. The reduction in length was taken from a relatively center flat portion of the ogival "nose" portion of the center electrode, with the overall shape of the inlet and exit portions of the ogival "nose" portion of the center electrode substantially unchanged. Flow rate is 15 gallons per minute and the velocity profile graphs again show dramatic improvement in flow profile uniformity over prior art approaches.

Figure 14:
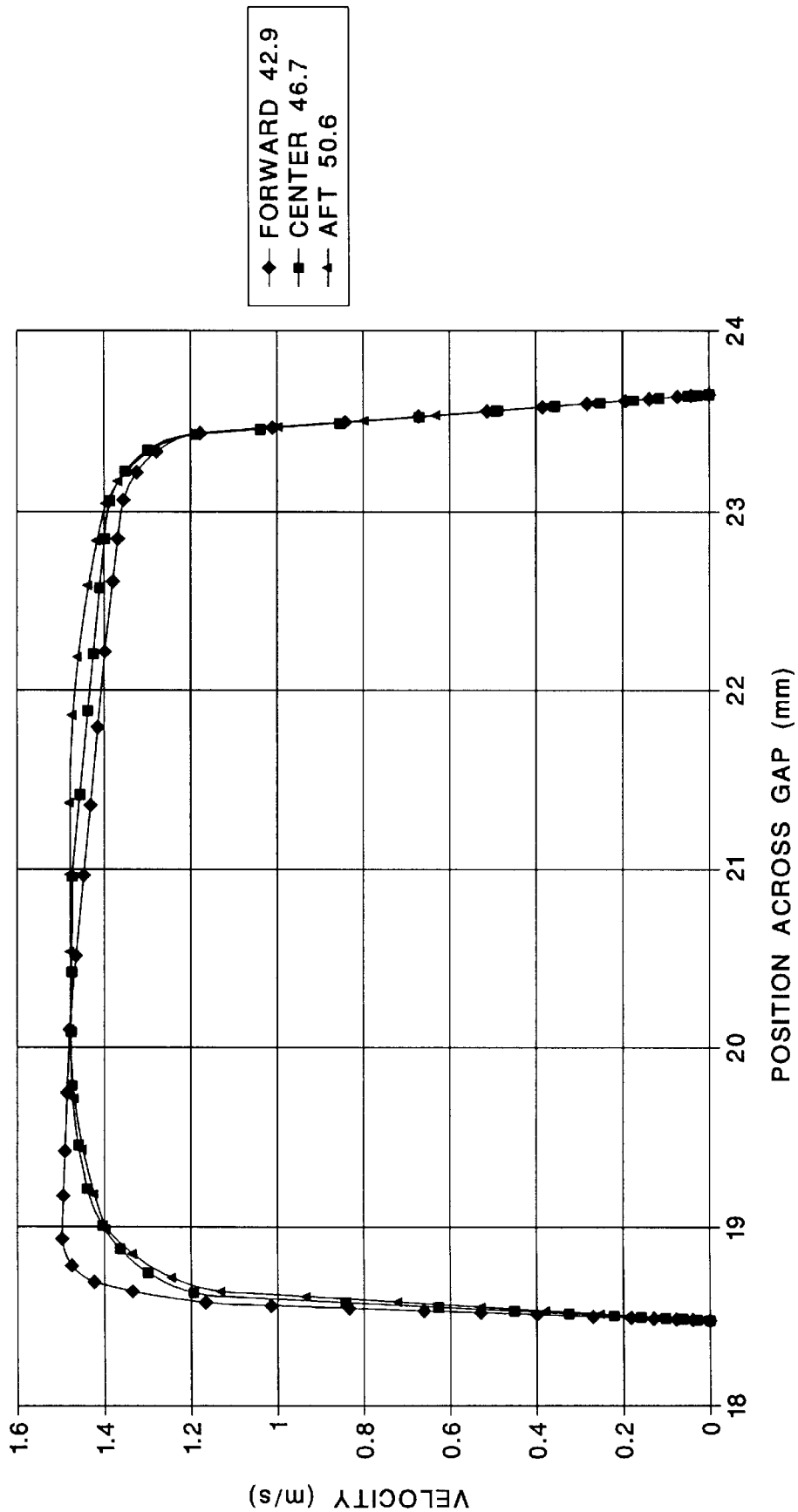
FIG. 14 is a superposition of a few of the several graphs of FIG. 13 over a narrower range of positions across the treatment zone.

Referring next to FIG. 14, a superposition is shown of a few of the several graphs of FIG. 13 over a narrower range of positions across the treatment zone between the electrodes.

Figure 15:
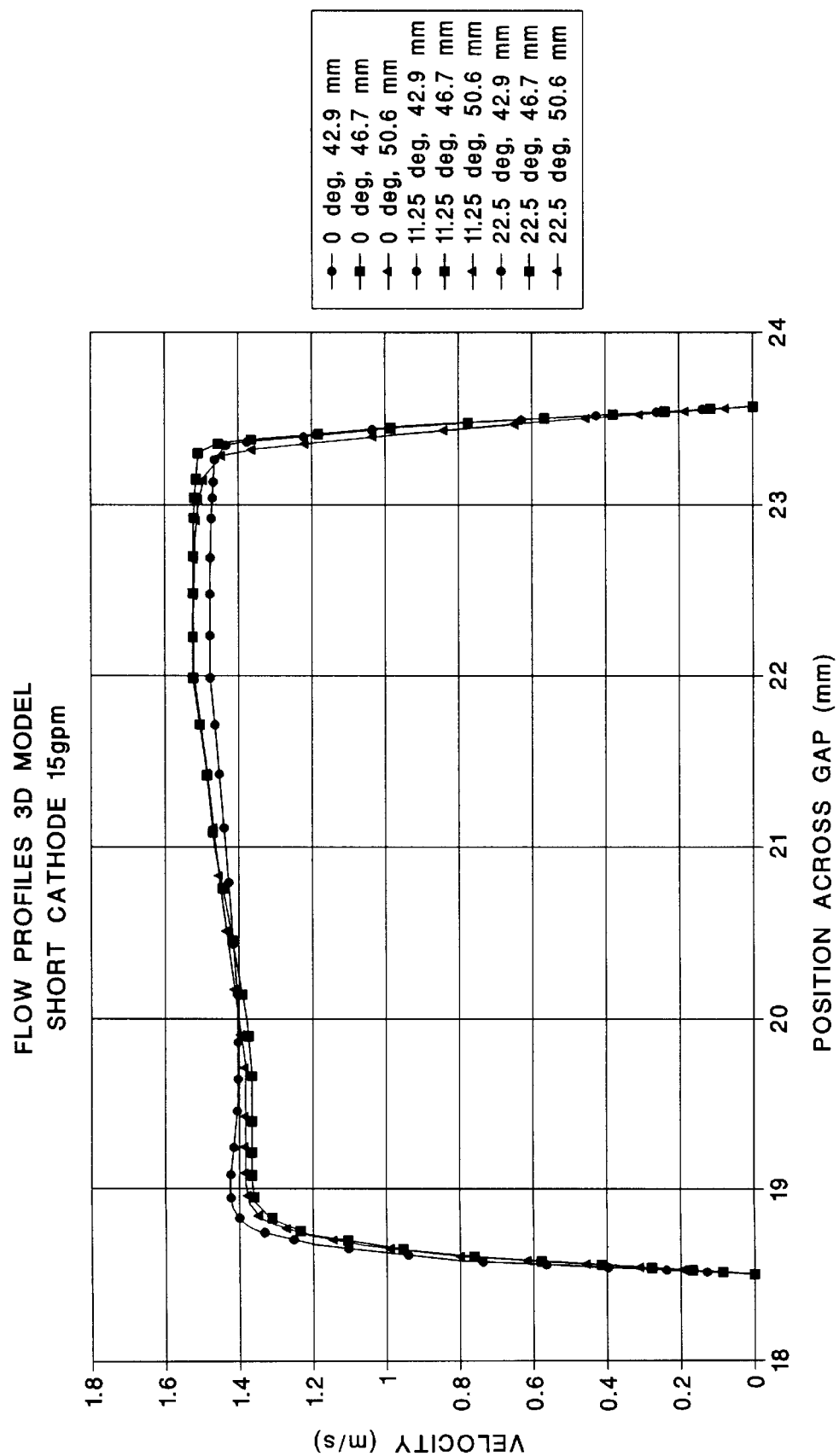
FIG. 15 is a superposition of several graphs taken at an exit manifold at various angles about a longitudinal axis of the variation of the treatment system of fluid velocity on a vertical axis versus position across the treatment zone between electrodes on a horizontal axis for a flow rate of 15 gallons per minute.

Referring next to FIG. 15, a superposition is shown of several graphs taken at three station points across the shorter ogival "nose" of the center electrode described in reference to FIG. 13 at various angular positions about a longitudinal axis of the embodiment of the treatment system of FIG. 3. The graphs show fluid velocity on a vertical axis versus position across the treatment zone between electrodes on a horizontal axis for a flow rate of 15 gallons per minute.

Test figures used in the generation of the graphs of FIG. 15 are derived from a three-dimensional model (unlike those of FIGS. 9 through 14, which are derived from a two-dimensional model). Such three-dimensional modeling is needed to determine whether any velocity profile effects are present in the treatment zone from the discrete exit pipes exiting radially from the exit manifold.

There are eight exit pipes arranged at equal radial intervals about the exit manifold at its perimeter, so that the exit pipes are spaced at 45 degrees apart azimuthally. Symmetry is used to reduce calculation time and number of curves in the present model. Azimuthal points are taken in line with an exit pipe at zero degrees midway between exit pipes at 22½ degrees and midway between these two points at 11¼ degrees. This analysis is repeated for each of the three station points (tip, middle, rear) in the treatment zone of the graphs of FIG. 14. FIG. 15 shows all curves plotted together and indicates that very little effect on velocity profile due to the discrete exit pipes about the exit conduit is seen in the treatment zone.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for reducing microorganism levels in products comprising:
   an inlet tube of substantially uniform cross-sectional area, the substantially uniform cross-sectional area extending from a distance before a treatment zone to at least into the treatment zone;
   a substantially ogival electrode nose positioned in the treatment zone; and
   an outer electrode forming an interior of the inlet tube in the treatment zone.

2. The apparatus of claim 1 wherein said substantially uniform cross-sectional area extends from a distance of at least twice an average diameter of said inlet tube before said treatment zone to at least into said treatment zone.

3. The apparatus of claim 1 further comprising:
   an exit manifold positioned after the treatment zone comprising at least one radial outlet extending radially from a longitudinal axis of the treatment zone.

4. The apparatus of claim 3 wherein an insulator body envelops the inner electrode within the exit manifold.

5. The apparatus of claim 3 further comprising: at least four radial outlets.

6. The apparatus of claim 1 further comprising a pulsed electric field generator.

7. The apparatus of claim 1 further comprising a pulsea electric field generator generating a pulsed electric field between the electrodes having an electric field strength of at least 5000 volts per centimeter.

8. The apparatus of claim 7 wherein said pulsed electric field has a pulse duration of no more than 100 microseconds.

9. The apparatus of claim 8 wherein said pulsed electric field has a pulse duration of at least 0.01 microseconds.

10. The apparatus of claim 1 wherein said inlet tube is substantially circular in cross-section.

11. The apparatus of claim 1 wherein an average inner diameter past the treatment zone is less than an average inner diameter within the treatment zone.

12. A method for reducing microorganism levels in a product comprising the steps of:
    flowing the product through an inlet tube of substantially uniform cross-sectional area extending from a distance before a treatment zone to at least into the treatment zone;
    flowing the product between a substantially ogival electrode nose positioned in the treatment zone, and an outer electrode forming an interior of the inlet tube in the treatment zone; and
    applying at least one high strength electric field pulse to the product during transit through the treatment zone for a duration which reduces the micro organism levels in the product.

13. The method of claim 12 wherein said flowing of said product through said inlet tube includes flowing said product through said inlet tube of substantially uniform cross-sectional area extending from said distance of at least twice an average diameter of the inlet tube before said treatment zone to at least into said treatment zone.

14. The method of claim 12 further comprising:
    flowing the product into an exit manifold positioned after the treatment zone; and
    flowing the product into a radial outlet extending radially from a longitudinal axis of the treatment zone.

15. The method of claim 14 wherein said applying of said high strength electric field pulse includes generating a pulsed electric field between the electrodes having an electric field strength of at least 5000 volts per centimeter.

16. The method of claim 15 wherein said applying of said high strength electric field pulse includes generating said pulsed electric field having a pulse duration of no more than 100 microseconds.

17. The method of claim 16 wherein said applying of said high strength electric field pulse includes generating said pulsed electric field having a pulse duration of at least 0.01 microseconds.

18. The method of claim 12 wherein said flowing of said product through said inlet tube of substantially uniform cross-section includes flowing said product through an inlet tube of substantially circular cross section.

19. The method of claim 12 further comprising flowing said product into a region past said treatment zone having an average inner diameter less than an average diameter within said treatment zone.

20. The method of claim 19 wherein said flowing of said product into said region past said treatment zone includes flowing said product into a region wherein said insulator body envelops the inner electrode.

* * * * *

UNITED STATES PATENT AND TRADEMARK OFFICE
CERTIFICATE OF CORRECTION

PATENT NO. : 6,027,754
DATED : February 22, 2000
INVENTOR(S) : Bushnell et al.

It is certified that error appears in the above-identified patent and that said Letters Patent is hereby corrected as shown below:

Title page,
After "Filed:", change "June 30, 1998" to -- June 29, 1998 --.

Claim 7,
Line 1, change "pulsea" to -- pulsed --.

Signed and Sealed this

Fifth Day of February, 2002

*Attest:*

*Attesting Officer*

JAMES E. ROGAN
*Director of the United States Patent and Trademark Office*